United States Patent [19]

Stewart

[11] Patent Number: 4,968,119
[45] Date of Patent: Nov. 6, 1990

[54] HIGH-DENSITY LIQUID-CRYSTAL ACTIVE DOT-MATRIX DISPLAY STRUCTURE

[75] Inventor: Roger G. Stewart, Hillsboro Township, Somerset County, N.J.

[73] Assignee: David Sarnoff Research Center, Inc., Princeton, N.J.

[21] Appl. No.: 295,416

[22] Filed: Jan. 10, 1989

[51] Int. Cl.⁵ .............................................. G02F 1/13
[52] U.S. Cl. ..................................... 350/333; 350/334
[58] Field of Search ................................. 350/333, 334

[56] References Cited

U.S. PATENT DOCUMENTS

| | | | |
|---|---|---|---|
| 4,384,763 | 5/1983 | Russo | 350/335 |
| 4,449,123 | 5/1984 | Muranaga | 340/176 |
| 4,513,282 | 4/1985 | Nakagiri | 340/765 |
| 4,563,806 | 1/1986 | Coissard et al. | 29/571 |
| 4,581,619 | 4/1986 | Mizutome et al. | 346/160 |
| 4,581,654 | 4/1986 | Kobayashi et al. | 358/230 |
| 4,582,395 | 4/1986 | Morozumi | 350/334 |
| 4,624,530 | 11/1986 | Takahara et al. | 350/336 |
| 4,644,338 | 2/1987 | Aoki et al. | 340/719 |
| 4,680,580 | 7/1987 | Kawahara | 340/784 |
| 4,687,299 | 8/1987 | Yamada | 350/336 |
| 4,694,287 | 9/1987 | Chenevas-Paoule et al. | 340/719 |
| 4,704,002 | 11/1987 | Kiluchi et al. | 350/334 |
| 4,740,782 | 4/1988 | Aoki et al. | 340/719 |
| 4,745,485 | 5/1988 | Iwasaki | 358/236 |
| 4,804,953 | 2/1989 | Castleberry | 350/333 X |

FOREIGN PATENT DOCUMENTS 0007344 1/1984 Japan ................................. 350/333

*Primary Examiner*—Stanley D. Miller
*Assistant Examiner*—Huy K. Mai
*Attorney, Agent, or Firm*—William J. Burke

[57] ABSTRACT

A liquid-crystal active dot-matrix display structure comprised of an array of pixel cells, which is implementable in integrated-circuit form, employs a spatial configuration for the respective pixel cells, each of which includes (1) a liquid-crystal element, (2) data line, (3) select line, and (4) drive-transistor, that both increases the proportion of the display-structure area occupied by the liquid-crystal elements themselves and also reduces parasitic capacitance, with respect to the spatial configurations employed by the prior art. The result is a brighter display that is particularly suitable for high-density displays (e.g., 1000 lines per inch in each dimension).

16 Claims, 3 Drawing Sheets

HIGH-DENSITY LIQUID-CRYSTAL ACTIVE DOT-MATRIX DISPLAY STRUCTURE

BACKGROUND OF THE INVENTION

1. Field of the Invention

This invention relates to an improvement in the structure of a liquid-crystal active dot-matrix display and, more particularly, to the spatial configuration of the components of such a display.

2. Description of the Prior Art

As known in the art, a liquid-crystal active display is comprised of liquid-crystal elements, each of which is rendered optically active in response to energization thereof by the operation of its associated field-effect driver-transistor. The driver-transistor, in response to a potential applied to its gate, operates to couple its source to its drain, which, in turn, is coupled to the liquid-crystal element associated with that driver-transistor, thereby energizing the liquid-crystal element. This requires that lines be provided for respectively coupling the source and gate of each driver-transistor to separate points of potential. It is apparent that while the driver-transistors and the lines of such a liquid-crystal active display occupy display area, the display area occupied thereby reduces the display area that can be occupied by the liquid-crystal elements of the display themselves. Thus, the brightness of a liquid-crystal active display is reduced in proportion to the display area not occupied by the liquid-crystal elements, (i.e., amount of the total display area occupied by the driver-transistors, the lines for operating the driver-transistors, etc.).

One known type of liquid-crystal active display structure is a two-dimensional active dot-matrix comprised of an array of pixel (picture element) cells arranged in rows and columns. The active dot-matrix display structure further includes a set of driver-transistor data lines and a set of driver-transistor select lines. A driver-transistor is associated with each individual pixel cell. The respective select lines may correspond with each row and the respective data lines may correspond with each column of the active dot-matrix display, or vice versa. In any event, the source of the driver-transistor associated with each individual pixel cell is coupled to a given coupling location on that data line which energizes that individual pixel cell. Further, the gate of the driver-transistor associated with each individual pixel cell is coupled to the select line which energizes that individual pixel cell.

It is apparent from the above discussion, that the proportion of the display area of a liquid-crystal two-dimensional active dot-matrix display structure occupied by (1) the respective driver-transistors, (2) the respective data lines and (3) the respective select lines increases as the line density of the rows and/or columns increases.

As is known in the art, a liquid-crystal two-dimensional active dot-matrix display structure is usually implemented as an integrated-circuit on a chip. Conventional liquid-crystal two-dimensional active dot-matrix displays generally exhibit a line density in each dimension of the order of 80 lines per inch. In this case, the respective driver-transistors, data lines and select lines occupy only a few percent of the total display area. Thus, the brightness of such a conventional display is limited only to a small extent by the non-optically-active display area occupied by the respective driver-transistors, data lines and select lines of the display. However, the situation is different for a high-density display, such as a display having a density of the order of 1,000 lines per inch in each dimension. The use of the same type of spatial configuration of the display components that is employed for conventional low-density displays would result in the respective optically-active liquid-crystal components of the display occupying only a relatively small (e.g., 30% in the case of 1,000 line per inch display) of the display area, thereby severely reducing the brightness of the display.

As is known, a liquid-crystal element constitutes a capacitance which is shunted by a parasitic capacitance that includes the capacitance of the liquid-crystal-element of each individual pixel cell to the particular data and select lines that are coupled to the driver-transistor associated with that individual pixel cell. This parasitic capacitance, which is undesirable, increases significantly as the line density of the display increases.

The present invention is directed to a new spatial configuration of the components of a liquid-crystal two-dimensional active dot-matrix display structure that (1) permits the proportion of the total display area occupied by the respective-crystal elements of a relatively high-density active dot-matrix display to be significantly increased, and (2) significantly reduces the undesirable parasitic capacitance normally exhibited by such a high-density active dot-matrix display.

SUMMARY OF THE INVENTION

In accordance with the principles of the present invention, the source of a driver-transistor and the given coupling location of that source to the associated particular data line energizing that driver-transistor are situated on the other side of that driver-transistor's associated particular select line from the location of the drain of that driver-transistor, whereby each driver-transistor includes a given portion thereof, situated between its source and drain, which intersects its associated particular select line. Further, the gate of each driver-transistor is situated in this given portion thereof and is located at the aforesaid intersection.

DESCRIPTION OF PREFERRED EMBODIMENT

Figure 1:
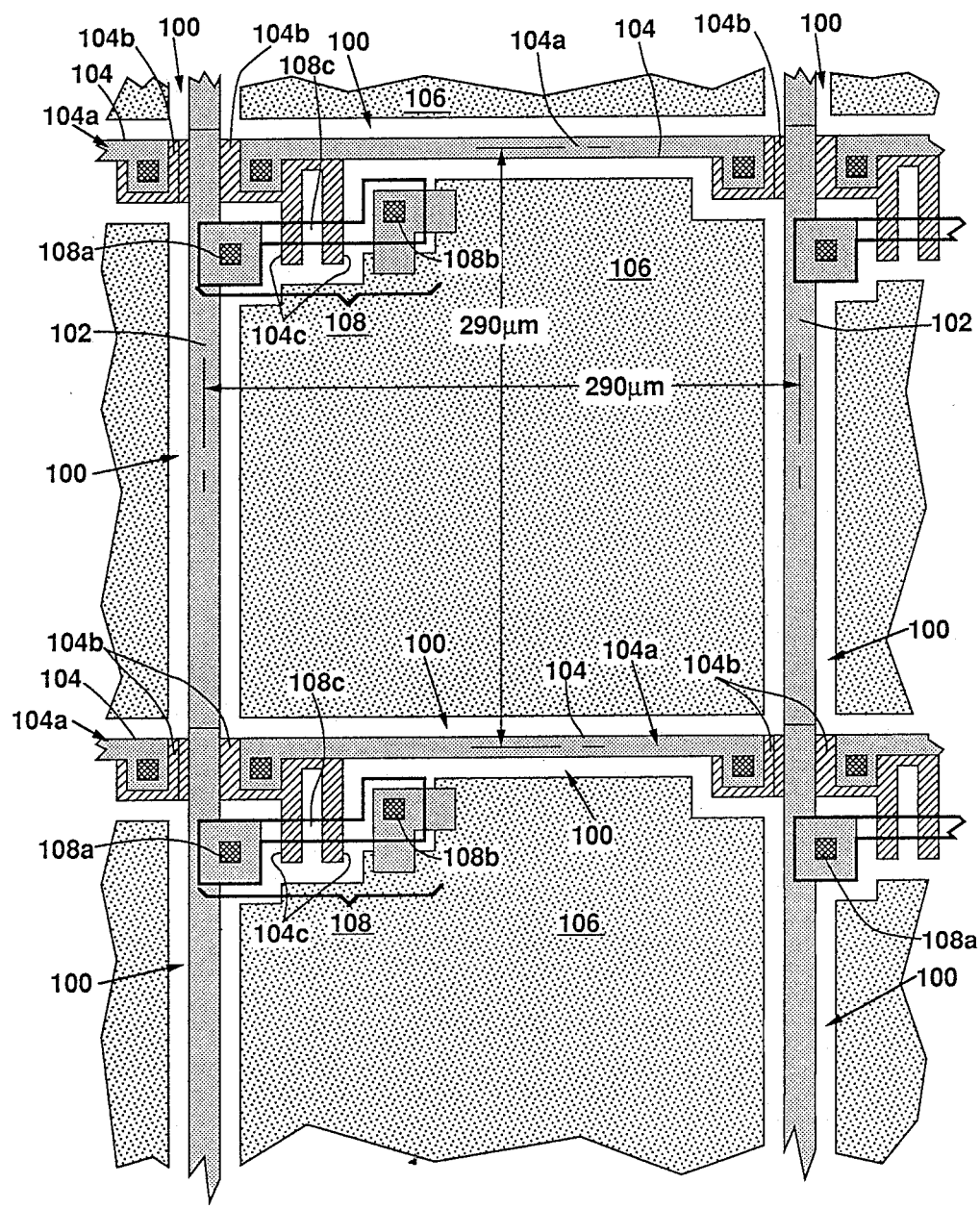
FIG. 1 illustrates an example of a prior-art display structure for a relatively low-density liquid-crystal two-dimensional active dot-matrix display.

Reference is made to FIG. 1, which shows a typical example of the spatial configuration of a conventional two-dimensional active dot-matrix display structure exhibiting a relatively low line density of pixel cells (e.g. about 80 lines per inch). Such conventional display structures are primarily employed for direct-view displays of pictures and alphanumeric characters, such as are used in portable television sets and lap-top computers, for instance. In such cases, if a high-resolution capability (i.e., a large number of pixels) is required of such a display, it is obtained by increasing the total area of the display structure, rather than by increasing the line density (i.e., the number of pixels per unit length in each of the two dimensions) of the display structure.

The display structure shown in FIG. 1 is comprised of an array of pixel cells arranged in rows and columns defined by the grid of data lines 102 and select lines 104. In FIG. 1, data lines 102 happen to be oriented in the column direction and select lines 104 happen to be oriented in the row direction. However, this is immaterial. The data lines could just as well be oriented in the row direction and select lines 104 in the column direction. In any event, each of data lines 102 and each of select lines 104, is a straight line. As indicated in FIG. 1, the line spacing of both data lines 102 and select lines 104 is 290 micrometers ($\mu$m), which corresponds to a line density of about 80 lines per inch in both the row and column directions. Pixel cell 100 which occupies the area enclosed by each pair of adjacent data lines 102 and each pair of adjacent select lines 104, has a symmetrical square shape.

Any one of various known integrated-circuit photolithographic processes may be employed for implementing a liquid-crystal two-dimensional active dot-matrix display structure having the above described spatial configuration. However, for illustrative purposes, it is assumed, in FIG. 1, that (1) all of the data lines 102 are comprised of a metal (e.g. aluminum) strips; (2) respective sections 104a of select lines 104 (each of which is separately associated with a corresponding individual pixel cell) are also comprised of metal strips; (3) adjacent ones of select-line sections 104a are electrically interconnected to one another at each intersection of a select line 104 with a data line 102 by a layer of polysilicon 104b (in a manner known in the art); and (4) such layer of polysilicon 104b is covered with an insulating layer of silicon dioxide (not shown) at its intersection with a data line 102, thereby preventing a short circuit between that data line 102 and that select line 104 (as is also known in the art).

As shown in FIG. 1, most of the area of each individual pixel cell 100 is occupied by its liquid-crystal element 106. Each pixel cell 100 further includes an associated field-effect driver-transistor 108 comprised of a source 108a, a drain 108b and a channel 108c interconnecting source 108a and drain 108b thereof. Drain 108b is electrically connected directly to the liquid-crystal element 106 of each pixel cell 100. Source 108a is electrically connected directly to the data line 102 that is associated with the individual pixel cell that includes that driver-transistor 108. The extension 104c of polysilicon 104b is capacitively coupled to the channel 108c of each driver-transistor 108 to form a gate electrode for that driver-transistor, which results in channel 108c electrically connecting source 108a to drain 108b of that driver-transistor 108 only in response to the energization of that select line 104 associated with the individual pixel cell 100 which includes that driver-transistor 108. As used herein, extension 104c is to be construed structurally as a separate and distinct element from select line 104 itself.

It will be noted that in the relatively low-density display structure shown in FIG. 1, the proportion of the total area of the display occupied by the liquid-crystal elements 106 of all of the pixel cells 100 of the display is much larger than that occupied by both the driver-transistors 108 of all the pixel cells 100 of the display and all the data lines 102 and select lines 104 of the display. This results in a bright display. It is further noted that because each liquid-crystal element 106 is relatively large, and the density of data lines and select lines is relatively low, the parasitic capacitance of the liquid-crystal elements 106 to the data lines and to the select lines is relatively small compared to the capacitance of the optically-active liquid-crystal elements 106 themselves, which is desirable.

Figure 2:
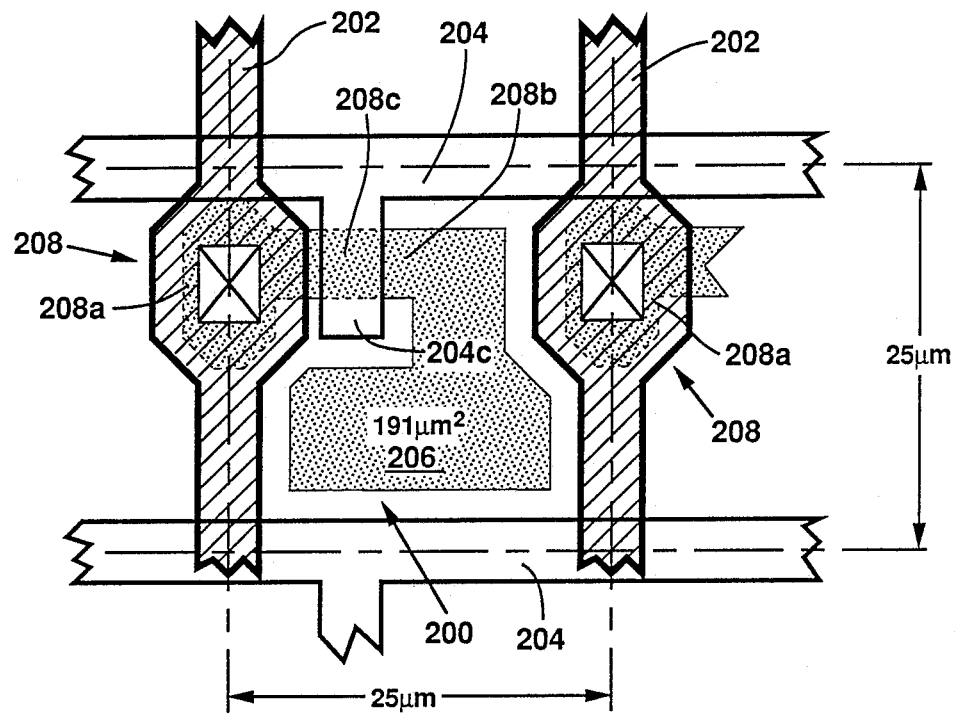
FIG. 2 illustrates an example of the display structure of a prior-art relatively high-density liquid-crystal two-dimensional active dot-matrix display.

Reference is now made to FIG. 2, which is directed to a high-density liquid-crystal two-dimensinal active dot-matrix display structure, which employs a spatial configuration similar to that shown by the low-density display structure of FIG. 1, although the integrated-circuit processes used in implementing the display structure of FIG. 2 are slightly different from those used in implementing the display structure of FIG. 1. Each of square symmetric pixel cells 200 of the display structure is defined by each pair of adjacent data lines 202 and each pair of adjacent select lines 204. Specifically, in the display structure of FIG. 2 liquid crystal element 206 and driver transistor 208 are both formed from a single layer of polysilicon which is thin enough to be optically transparent. This single layer of polysilicon, which forms the electrically portions of source 208a, drain 208b and channel 208c of the driver transistor 208 of FIG. 2, is electrically isolated from all other layers of the integrated circuit by a gate oxide except at the contact area 208a. In addition, the difference between the displays shown in FIGS. 1 and 2 is that the spacing distance between adjacent data lines 202 and the spacing distance between select lines 204 in FIG. 2 are each 25 $\mu$m (i.e., about 1000 lines per inch).

A further difference between the implementing integrated circuit of FIG. 2 and of FIG. 1 is that, in FIG. 2, each select line 204 is completely comprised of a polysilicon layer, (rather than the combination of metal strips 104a and a polysilicon layer 104b of the display structure of FIG. 1). However, in FIG. 2, although each of its components 200, 202, 204, 204c, 206, 208, 208a, 208b and 208c, respectively, corresponds in all functional respects with each of components 100, 102, 104, 104c, 106, 108, 108a, 108b and 108c, respectively, of FIG. 1, structurally, extension 204c is to be construed as a separate and distinct element from select line 204 itself.

High-density liquid-crystal active dot-matrix display structures are required in such applications as (1) liquid-crystal projection displays, (2) electronic viewfinder displays, and (3) so-called "heads up" type displays. Such displays, because they require small-area display structures, need to provide a relatively high brightness per unit area. However, the fact is that scaling the line density from about 80 lines per inch to 1000 lines per inch in each dimension of the display inherently reduces the proportion of the total display structure area that is occupied by the optically active liquid-crystal elements of the structure. Employing the prior-art spatial configuration shown in FIG. 2 for the high-density display structure results in the area occupied by the liquid-crystal element 206 of each pixel cell 200 being only 191 $\mu$m$^2$ and the area occupied by the liquid-crystal elements 206 of all of the pixel cells 200 of the display structure being reduced to substantially only 30% of the total area of the display. This is because of the relatively large amount of the display-structure per unit area thereof taken up by the much greater number of data lines 202, select lines 204 and driver-transistors 208 of FIG. 2 with respect to the corresponding components of FIG. 1. Further, this greater number of components, which results in smaller individual pixel cells 200 and smaller liquid-crystal elements, significantly increases the ratio of the parasitic capacitance of the display structure with respect to the capacitance of the liquid-crystal elements 206 themselves of the display structure. This increase in parasitic capacitance is undesirable.

Figure 3:
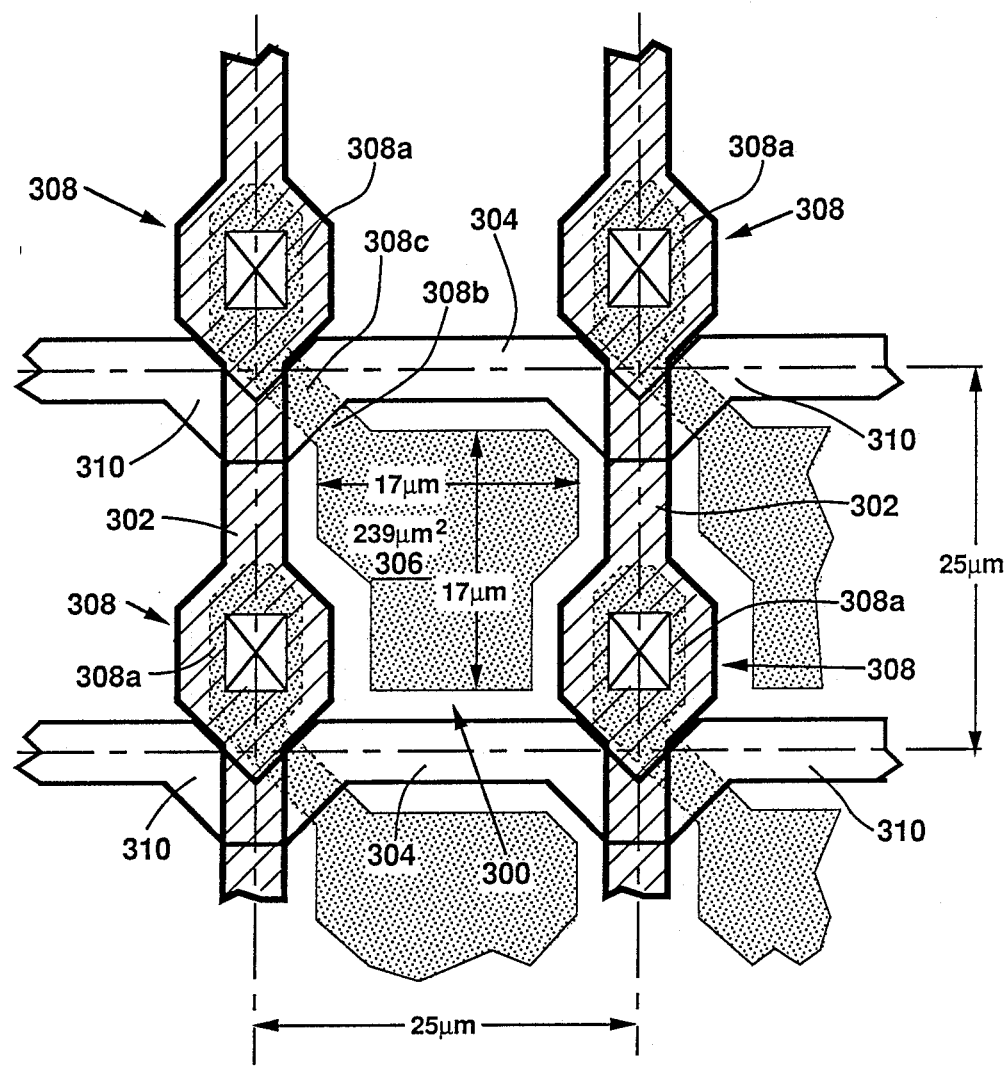
FIG. 3 illustrates a preferred embodiment of the display structure of a relatively high-density liquid-crystal two-dimensional active dot-matrix display incorporating the present invention.

FIG. 3, which illustrates a high-density liquid-crystal two-dimensional active dot-matrix display structure incorporating the present invention, is similar to the prior-art high-density liquid-crystal two-dimensional active dot-matrix display structure shown in FIG. 2 to the extent that they both are implemented by the same integrated circuit processes and that the respective spacing distance between adjacent data lines and between adjacent select lines of both of them is 25 μm (about 1000 lines per inch). However, the spatial configuration of the respective components of the display structure shown in FIG. 3 is significantly different from the prior-art spatial configuration of the corresponding respective components shown in FIG. 1 or in FIG. 2.

Specifically, components 300, 302, 304, 306, 308, 308a, 308b and 308c of FIG. 3 functionally correspond respectively with components 200, 202, 204, 206, 208, 208a 208b and 208c of FIG. 2. However, in the spatial configuration of the display structure shown in FIG. 3, the driver-transistor 308 associated with each individual pixel cell 300 has its source 308a situated outside of the area of that individual pixel cell. Specifically, the source 308a of each driver-transistor 308 is located on the opposite side of the particular select line 304 that controls the operation of that driver-transistor 308. The liquid-crystal element 306 and the drain 308b connected thereto of the driver-transistor 308 associated with each individual pixel cell 300 is located inside of the area of that individual pixel cell, so that channel 308c of that driver-transistor 308, which interconnects the source 308a and the drain 308b thereof, must cross the aforesaid particular select line 304, as indicated in FIG. 3. Thus a capacitively-coupled gate for operating each driver-transistor 308 is inherently produced at the intersection of the channel 308c of that driver-transistor with the particular select line 304 that crosses the channel 308c of that driver-transistor 308.

As indicated in FIG. 3, the source 308a of each driver-transistor 308 and the particular data line 302 to which that source 308a is electrically coupled are spatially oriented in a substantially wholly overlapping relationship with one another. Further, in the spatial configuration of the display structure shown in FIG. 3, each select line 304 is preferably not a straight line, but includes a plurality of V-shaped portions 310, each of which crosses a separate one of the respective data lines 302. This permits the source 308a of each driver-transistor 308 to be disposed within the notch of the V-shaped portion 310 and also permits the channel 308c of the driver-transistor 308 to intersect one arm of that V-shaped portion 310 at a substantially right angle, as indicated in FIG. 3.

From the foregoing discussion of the spatial configuration of the structure shown in FIG. 3, it is apparent that much of the area of the display structure taken up by the respective driver-transistors thereof overlaps areas of the display structure already taken up by the respective data lines 302 and select lines 304 thereof. Of particular significance, is the fact that the gate electrode of each driver-transistor 308 takes up no additional area at all, since it is entirely located at the intersection of a particular select line 304 and the channel 308c of each driver-transistor 308. This differs markedly from the spatial configuration of the prior-art display structure shown in FIGS. 1 and 2, wherein substantially all of each driver-transistor occupies space within the area of each individual symmetrical (square) pixel cell thereof (which is the area of the display structure that is in addition to the area occupied by the data lines and select lines thereof). Furthermore, the area of the display structures shown in FIGS. 1 and 2 that is occupied by extension 104c from select line 104 and extension 204c from select line 204 is entirely eliminated in the spatial configuration of the display structure shown in FIG. 3.

The result of the above-discussed spatial configuration of the high-density liquid-crystal two-dimensional dot-matrix display structure shown in FIG. 3, wherein the shape of the area occupied by each individual pixel cell together with its associated driver-transistor is asymmetric, is to provide substantially more area within each individual pixel cell for its optically-active liquid-crystal element 306. Specifically, as indicated in FIG. 3, solely the drain 308b of the driver-transistor 308 associated with each individual pixel cell 300, which is coupled to the liquid-crystal element 306 of that individual pixel cell 300, extends into a spacing area surrounding the liquid-crystal element 306 that separates it from the particular data line 302 and the particular select line 304 associated with that individual pixel cell 300. This permits each liquid-crystal element 306 to occupy an area of 239 μm², rather than only 191 μm² occupied by the liquid-crystal element 206 of each individual pixel cell in the spatial configuration of the display structure shown in FIG. 2 for the same 25 μm spacing between the select lines or between data lines. In FIG. 3, the proportion of the total area of the display structure occupied by the liquid-crystal element 306 thereof is substantially 38%, while the liquid-crystal elements 206 occupy only substantially 30% of the total area of the display structure shown in FIG. 2. Therefore, the spatial configuration of the display structure shown in FIG. 3 will be about 25% brighter than the display structure shown in FIG. 2.

In addition to being brighter, the spatial configuration of the display structure shown in FIG. 3 exhibits substantially lower parasitic capacitance than that exhibited by the display structure of FIG. 2. In addition, the capacitance exhibited by the relatively larger-area liquid-crystal elements 306 themselves is significantly greater than the capacitance exhibited by the relatively smaller-area liquid elements 206 themselves. Thus, the ratio of parasitic capacitance to liquid-crystal element capacitance is substantially smaller. For these reasons, the undesirable effects of parasitic capacitance is materially reduced by the spatial configuration of the display structure of the present invention.

For illustrative purposes, it has been assumed that particular known integrated-circuit processes were employed in the manufacture of the display structure shown in FIG. 3. However, the present invention is directed to the spatial configuration of the display structure, and not to the particular processes or materials employed in its manufacture. Therefore, other integrated-circuit processes known in the art may be employed to manufacture a liquid-crystal two-dimensional active dot-matrix display structure having a spatial configuration that incorporates the principles of the present invention.

What is claimed is:

1. In a liquid-crystal two-dimensional active dot-matrix display structure comprised of an array of pixel cells, each of which includes a liquid-crystal element which is rendered optically active in response to energization thereof, said array of pixel cells being arranged in rows and columns; said display structure further comprising a set of data lines and a set of select lines, with each line of said set of select lines being individually associated with a row of said array of pixel cells and with each line of said set of data lines being individually associated with a column of said array of pixel cells, and each individual pixel cell including a field-effect driver-transistor which couples the particular data line individually associated with that column which includes that individual pixel cell to said liquid-crystal element of that individual pixel cell in response to the energization of the particular select line individually associated with that row which includes that individual pixel cell to energize and render optically active the liquid-crystal element of that individual pixel cell; the driver-transistor of each individual pixel cell including a drain coupled to the liquid-crystal element of that individual pixel cell, a source coupled to a given coupling location on the associated particular data line, and a gate situated between said source and drain which is coupled to its associated particular select line; the improvement wherein:

said given coupling location and said source of each driver-transistor are situated on the opposite side of the associated particular select line from the location of the drain of that driver-transistor, whereby each driver-transistor includes a given portion thereof situated between its source and drain which intersects its associated particular select line; and said gate of each driver-transistor is situated in said given portion thereof and located at said intersection.

2. The display structure defined in claim 1, wherein:
the source of each driver-transistor and the associated particular data line are situated in overlapping relationship with one another.

3. The display structure defined in claim 2, wherein:
the source of each driver-transistor and the associated particular data line are situated in a substantially wholly overlapping relationship with one another.

4. The display structure defined in claim 2, wherein:
respective select lines and data lines cross one another and a select line includes a V-shaped portion situated at its crossing of a data line; and
a part of said given portion of a driver transistor associated with a particular data line and a particular select line which is situated between said source thereof and said intersection with said particular select line is disposed within the notch of said V-shaped portion of said particular select line associated with that driver-transistor.

5. The display structure defined in claim 4, wherein:
said liquid-crystal element of each individual pixel cell is surrounded by a spacing area that separates that liquid-crystal element from the particular data line and the particular select line associated with that individual pixel cell by at least a given spacing distance, and solely the drain of the driver-transistor of that individual pixel cell, which is coupled to the liquid-crystal-element thereof, extends into said spacing area surrounding said liquid-crystal element of that individual pixel cell.

6. The display structure defined in claim 5, wherein:
said liquid-crystal element and said source, drain and given portion of the driver-transistor of each pixel cell of said array are all comprised of a single layer of polysilicon.

7. The display structure defined in claim 5, wherein:
the density of said data lines and said select lines are each substantially greater than 80 lines per inch.

8. The display structure defined in claim 7, wherein:
the density of said data lines and said select lines are each of the order of 1000 lines per inch.

9. The display structure defined in claim 2, wherein:
said liquid-crystal element of each individual pixel cell is surrounded by a spacing area that separates that liquid-crystal element from the particular data line and the particular select line associated with that individual pixel cell by at least a given spacing distance, and solely the drain of the driver-transistor of that individual pixel cell, which is coupled to the liquid-crystal-element thereof, extends into said spacing area surrounding said liquid-crystal element of that individual pixel cell.

10. The display structure defined in claim 9, wherein:
said liquid-crystal element and said source, drain and given portion of the driver-transistor of each pixel cell of said array are all comprised of a single layer of polysilicon.

11. The display structure defined in claim 9, wherein:
the density of said data lines and said select lines are each substantially greater than 80 lines per inch.

12. The display structure defined in claim 11, wherein:
the density of said data lines and said select lines are each of the order of 1000 lines per inch.

13. The display structure defined in claim 1, wherein:
said liquid-crystal element of each individual pixel cell is surrounded by a spacing area that separates that liquid-crystal element from the particular data line and the particular select line associated with that individual pixel cell by at least a given spacing distance, and solely the drain of the driver-transistor of that individual pixel cell, which is coupled to the liquid-crystal-element thereof, extends into said spacing area surrounding said liquid-crystal element of that individual pixel cell.

14. The display structure defined in claim 13, wherein:
said liquid-crystal element and said source, drain and given portion of the driver-transistor of each pixel cell of said array are all comprised of a single layer of polysilicon.

15. The display structure defined in claim 13, wherein:
the density of said data lines and said select lines are each substantially greater than 80 lines per inch.

16. The display structure defined in claim 15, wherein:
the density of said data lines and said select lines are each of the order of 1000 lines per inch.

* * * * *